(12) United States Patent
Yang et al.

(10) Patent No.: US 6,963,921 B1
(45) Date of Patent: Nov. 8, 2005

(54) METHOD AND APPARATUS FOR HARDWARE ASSISTED TCP PACKET RE-ASSEMBLY

(75) Inventors: Li-Jau Yang, San Jose, CA (US); Chi-Lie Wang, Sunnyvale, CA (US); Kap Soh, Fremont, CA (US); Chin-Li Mou, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 690 days.

(21) Appl. No.: 09/785,015

(22) Filed: Feb. 16, 2001

(51) Int. Cl.[7] .............................................. G06F 15/16
(52) U.S. Cl. ..................... 709/230; 709/231; 709/232; 709/233; 370/229; 370/230
(58) Field of Search .................... 709/230; 370/229, 370/235

(56) References Cited

U.S. PATENT DOCUMENTS

| | | | |
|---|---|---|---|
| 5,867,509 A * | 2/1999 | Tanaka ........................ 714/758 |
| 6,424,650 B1 * | 7/2002 | Yang et al. .................. 370/390 |
| 6,430,233 B1 * | 8/2002 | Dillon et al. ................ 375/316 |
| 6,690,667 B1 * | 2/2004 | Warren ........................ 370/389 |
| 2002/0067745 A1 * | 6/2002 | Coupe et al. ................ 370/535 |
| 2002/0118682 A1 * | 8/2002 | Choe ....................... 370/395.31 |
| 2002/0186705 A1 * | 12/2002 | Kadambi et al. ........... 370/452 |
| 2004/0083299 A1 * | 4/2004 | Dietz et al. ................. 709/230 |

* cited by examiner

Primary Examiner—Rupal Dharia
Assistant Examiner—Djenane Bayard
(74) Attorney, Agent, or Firm—John W. Carpenter; Reed Smith, LLP (57) ABSTRACT

A hardware packet accelerator parses incoming packets to retrieve header data for building a frame status and for verifying the incoming packets are part of an established connection with a host. The accelerator includes a connection database that allows retrieval of connection information based on an index constructed from a hashed TCP connection address. The frame status comprises information needed to perform packet re-assembly and is stored in a memory that is local (directly accessible) by a processing device that performs the packet re-assembly. Among other advantages, the processing device does not need to read packet header data from a packet buffer, saving large amounts of header data retrieval time.

10 Claims, 7 Drawing Sheets

Fig. 1

| OSI | | | | | | TCP/IP |
|---|---|---|---|---|---|---|
| Application | SMB | | | | | Application |
| Presentation | | | | | | |
| Session | NetBIOS | | NetBIOS | NetBIOS | | |
| Transport | IPX[1] | NetBEUI | DECnet | TCP&UDP | TCP/UDP | |
| Network | | | | IP | IP | |
| Link | 802.2, 802.3, 802.5 | 802.2 | Ethernet V2 | Ethernet V2 | Ethernet or others | |
| | | 802.3, 802.5 | | | | |
| Physical | | | | | | |

Combined LAN Adapter and Transceiver

Note: TCP connection Address = {source IP addr, destination IP addr, TCP source port #}

METHOD AND APPARATUS FOR HARDWARE ASSISTED TCP PACKET RE-ASSEMBLY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to network communications. The present invention is more particularly related to packet re-assembly. The present invention is still more particularly related to accelerating packet re-assembly and the identification of connections for incoming packets and removal of packets without a corresponding connection.

2. Discussion of Background

Although this specification presumes familiarity with the general concepts, protocols, and devices commonly used in LAN networking applications, each of which have corresponding standards that are publicly available, (e.g., the IEEE 802.3 standard (Ethernet)), a brief overview is provided.

General Network Topology

Figure 1:
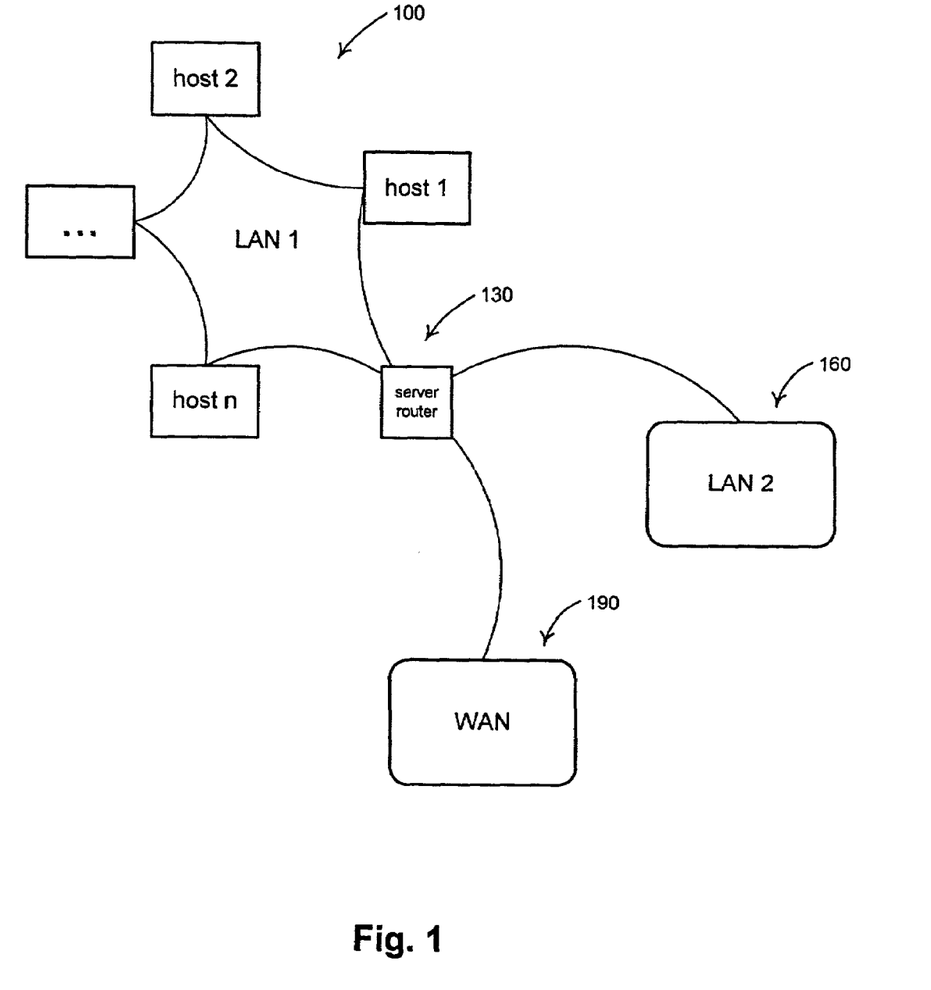
FIG. 1 is a block diagram representing a modern LAN.

Local area networks (LANs) are arrangements of various hardware and software elements that operate together to allow a number of digital devices to exchange data within the LAN and also may include internet connections to external wide area networks (WANs). FIG. 1 is a diagram representing a modern LAN 100 comprised of one to many Hosts or End Systems (ESs) such as hosts 1 . . . n that are responsible for data transmission throughout the LAN. The ESs may be familiar end-user data processing equipment such as personal computers, workstations, and printers and additionally may be digital devices such as digital telephones or real-time video displays. Different types of ESs can operate together on the same LAN. In FIG. 1, the hosts 1 . . . n are on a ring type LAN having a server/bridge/router device 130, that may also be referred to as an Intermediate System (IS), that serves various network functions for the LAN 100, and administers each of a bridge to an attached LAN 160 and a router to a Wide Area Network (WAN) 190. However, modern networks may be composed of any number of hosts, bridges, switches, hubs, routers, and other network devices, and may be configured as any one or more of ring, star, and other configurations.

Packets

In a LAN such as 100, data is generally transmitted between ESs as independent packets, with each packet containing a header having at least a destination address specifying an ultimate destination and generally also having a source address and other transmission information such as transmission priority. Packets are generally formatted according to a particular protocol and contain a protocol identifier of that protocol. Packets may be encased in other packets.

Layers

Figure 2:
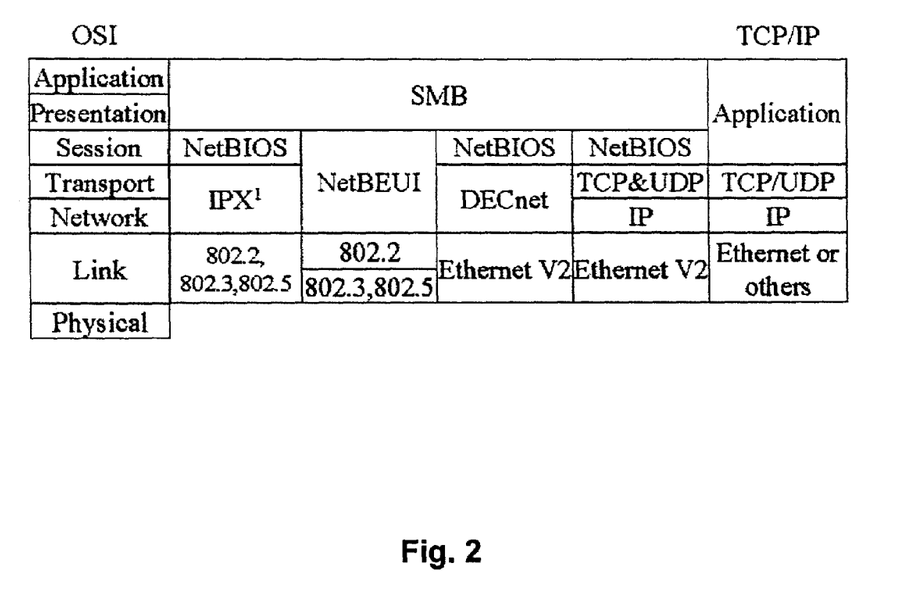
FIG. 2 is an illustration of various examples of layered network standards.

Modern communication standards, such as the TCP/IP Suite and the IEEE 802 standards, organize the tasks necessary for data communication into layers. At different layers, data is viewed and organized differently, different protocols are followed, different packets are defined and different physical devices and software modules handle the data traffic. FIG. 2 illustrates various examples of layered network standards having a number of layers. Corresponding levels of the various network standards are shown adjacent to each other and the OSI layers, which are referred to herein as: the Physical Layer, the Data Link Layer, the Routing Layer, the Transport Layer, the Session Layer, the Presentation Layer and the Application Layer, are also shown for reference. Please note the TCP/IP protocol layers shown.

Generally, when an ES is communicating over a network using a layered protocol, a different software module may be running on the ES at each of the different layers in order to handle network functions at that layer.

Drivers and Adapters

Each of the ISs and ESs in FIG. 1 includes one or more adapters and a set of drivers. An adapter generally includes circuitry and connectors for communication over a segment and translates data from the digital form used by the computer circuitry in the IS or ES into a form that may be transmitted over the segment, which may be electrical signals, optical signals, radio waves, etc. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

NIC Driver

The lowest layer adapter software operating in one type of network ES is generally referred to as a NIC (Network Interface Card) driver. A NIC driver is layer 2 software designed to be tightly coupled to and integrated with the adapter hardware at the adapter interface (layer 1) and is also designed to provide a standardized interface between layer 2 and 3. Ideally, NIC drivers are small and are designed so that even in an ES with a large amount of installed network software, new adapter hardware can be substituted with a new NIC driver, and all other ES software can continue to access the network without modification.

NIC drivers communicate through one of several available NIC driver interfaces to higher layer network protocols. Examples of NIC driver interface specifications are NDIS (Network Driver Interface Specification developed by Microsoft and 3Com) and ODI (Open Data-Link Interface developed by Apple Computer and Novell).

Protocols

Ethernet is logical communication protocol that permits multiple devices to talk to each other over a variety of physical media. The Ethernet protocol is described in the IEEE 802.3 standard and utilizes a protocol called Carrier Sense Multiple Access with Collision Detection (CSMA/CD). CSMA/CD is a broadcast mechanism where one station speaks while all others listen. When two stations try to speak at the same time, a collision takes place. With CSMA/CD, both stations detect the collision, back off, and retry later.

Figure 3A:
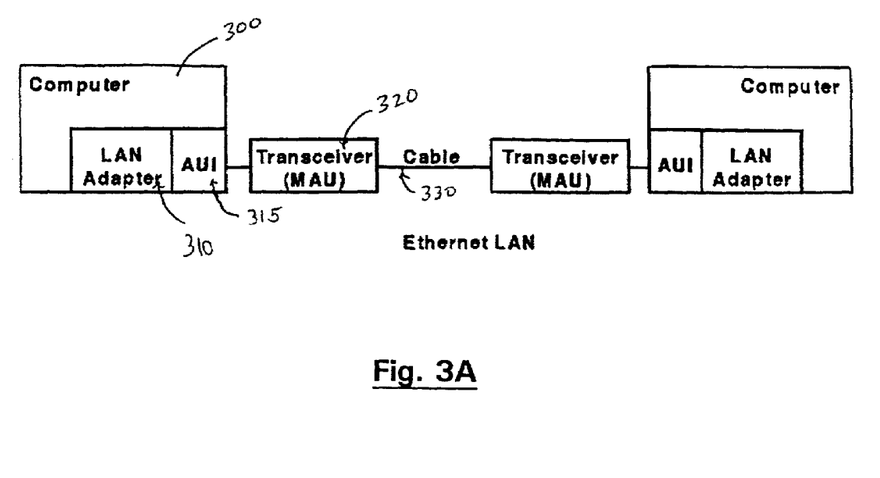
FIG. 3A is a block diagram of a simple Ethernet LAN.
Figure 3B:
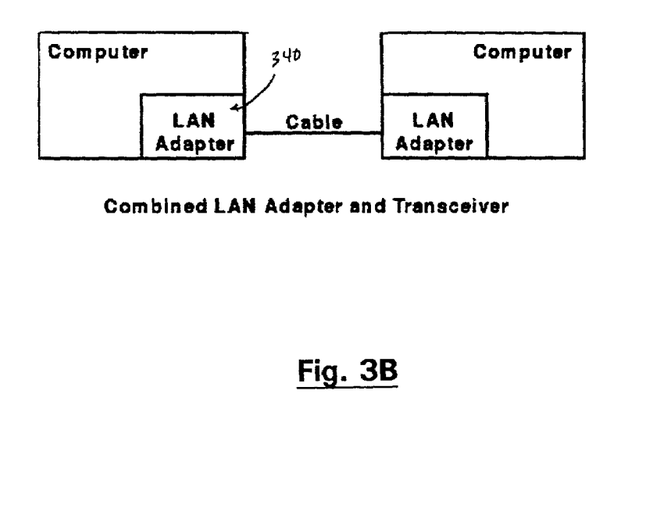
FIG. 3B is a block diagram of an Ethernet LAN having a combined adapter and transceiver.

A simple form of an Ethernet local area network (LAN) is illustrated by a Simple Ethernet LAN in FIG. 3A. A LAN adapter 310 provides the interface between a host 300 and an Ethernet transceiver 320, also called a medium attachment unit (MAU). The MAU 320 provides a physical interface to a LAN medium 330. An interface between the LAN adapter 310 and transceiver 320 is the adapter unit interface (AUI) 315. The Ethernet (LAN) medium 330 is normally a cable. The type of cable depends on the type of Ethernet. In many cases, a single electronics board combines the LAN adapter 310 and the transceiver 320 as LAN Adapter 340 (see FIG. 3B).

Table 1 provides the Ethernet/IEEE802 Packet Format:

TABLE 1

| MAC header | IP header | TCP header | Payload | CRC |
|---|---|---|---|---|

The Ethernet protocol runs on top of and therefore contains the TCP/IP protocol. The Media Access Control (MAC) header contains a MAC number that is a unique address of a host or other device connected to the LAN (NIC, for example). Although Ethernet is a popular protocol, other protocols are also in common use.

The TCP/IP (Transmission Control Protocol/Internet Protocol) protocol is a suite of protocols and is the standard for connection based data transmission and services across the Internet. The Transmission Control Protocol manages the packaging of data into packets that get routed on different paths over the Internet and reassembled at their destination. The Internet Protocol handles the address part of each data packet so that it is routed to the correct destination.

TCP re-assembly is the task performed for identifying and routing an incoming packet received at a host. Traditionally, the tasks of TCP re-assembly have been performed either by a host CPU or an embedded processor. In either case, to carry out this task, the CPU has to first identify which TCP connection the incoming packets belong to. It then extracts certain fields off of TCP/IP headers of the incoming packets to identify the sequence of the received payload within a current segment data file.

To carry out these tasks, the CPU, or embedded processor, accesses a packet data buffer to retrieve packet header data and process the TCP/IP headers as required. The CPU is on the data path and heavily loaded for this intensive computational work. In today's high speed networking such as Gigabit Ethernet or 10 Gigabit Ethernet, typical CPU's are unable to keep up with the wire speed and therefore, the overall throughput or performance will suffer.

SUMMARY OF THE INVENTION

The present inventors have realized that data rates for incoming packets at a host device can be increased if the methods for processing the incoming packets have fast access to header data needed for processing the incoming packets. In addition, efficiency can be increased if packets are quickly identified as the their appropriate connection, and discarded if they do not have a corresponding connection.

Header data from incoming packets are parsed and checked against a TCP connection address table to identify connections corresponding to the incoming packets. The parsed header fields are used to construct a frame status that includes header data needed for further processing of the incoming packet. The frame status is stored in a memory local to the processing mechanism that performs the further processing on the incoming packet.

The present invention is embodied as a packet accelerator device, comprising a packet header parser configured to parse packet header fields from incoming packets directed toward a host, a processing mechanism configured to perform packet re-assembly on packets determined to have valid connections with said host, an address filter configured to identify data parsed from said packet header fields needed for packet re-assembly and place that data in a local memory directly accessible by said processing mechanism. In another embodiment, the packet accelerator device comprises a packet header parser configured to parse packet header fields from incoming packets directed toward a host, a processing mechanism configured to perform packet re-assembly on packets determined to have valid connections with said host, an address filter configured to identify packets that are part of established connections with said host and forward those packets to said processing mechanism, and discard packets that are not part of an established connection, wherein said accelerator device is attached but not powered by a CPU of said host.

The present invention includes a method of accelerating packet re-assembly, comprising the steps of parsing a header fields of an incoming packet to determine data needed for packet re-assembly, forwarding the packet to be re-assembled to a re-assembly mechanism, and placing the data needed for packet re-assembly in a local memory directly accessible by said re-assembly device. The method may also be embodied as a method of accelerating packet re-assembly, comprising the steps of parsing a header fields of an incoming packet to determine data needed for packet re-assembly, determining if the incoming packet is part of an established connection, forwarding the packet determined to be part of an established connection to be re-assembled by a re-assembly mechanism, and discarding packets determined to not be part of an established connection, wherein said steps of parsing, determining, forwarding and discarding are not performed by a CPU of said host.

At least portions of both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 4:
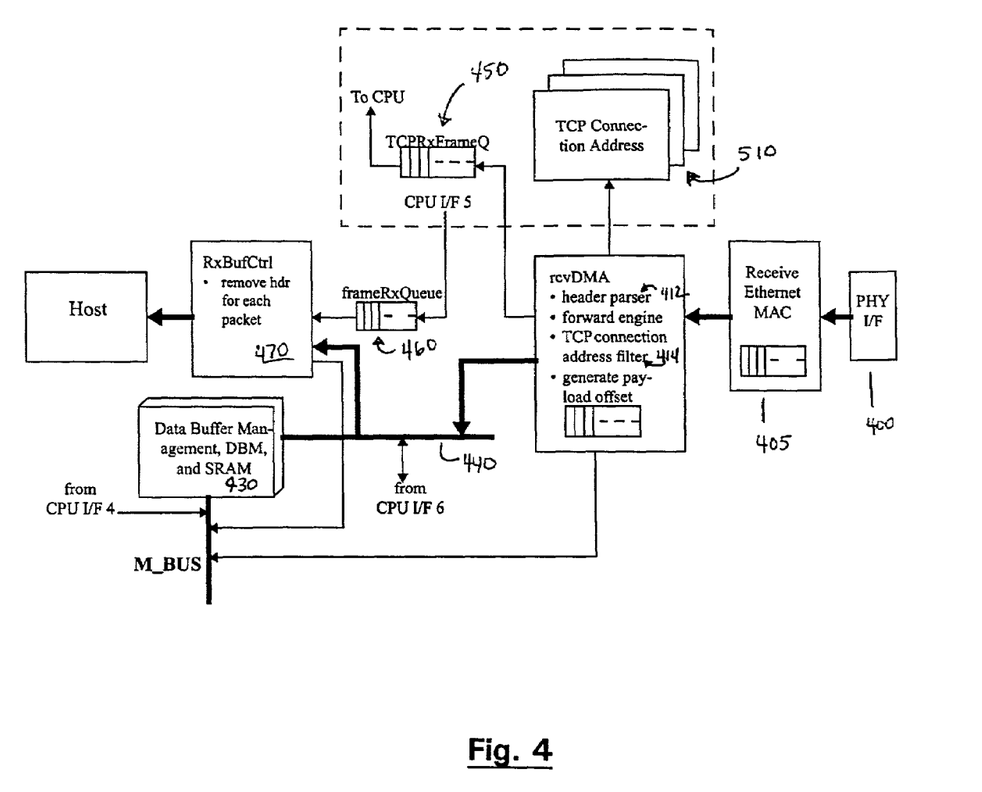
FIG. 4 is a block diagram of components and data flow according to an embodiment of the present invention.

Referring again to the drawings, wherein like reference numerals designate identical or corresponding parts, and more particularly to FIG. 4 thereof, there is illustrated a block flow diagram of a hardware based TCP packet re-assembly accelerator developed by the present inventors. The accelerator is attached to a network and connected to a host device. An embedded CPU (not shown) performs packet re-assembly functions.

Data is received at a Physical layer interface 400 from a network (Ethernet, for example) and verified and transported via an Ethernet MAC 405 to an rcvDMA device 410. The rcvDMA device 410 includes some of the main components of the present invention, including, a packet header parser 412, and a TCP connection address filter 414. The packet header parser 412 parses TCP/IP headers of incoming packets and extracts pre-defined fields (information) out of the TCP/IP headers. The extracted information will be further used by the TCP connection address filter 414 and the embedded CPU. The TCP connection address filter 414 accurately and quickly renders forward decisions for data frames (or packets) transported in a high performance network.

Traditionally, address filter functionality is performed by taking a set of lower bits of a 32-bit CRC value of a raw address as an index to a lookup table, which is initialized by either host driver or embedded firmware. If the value of the indexed location is set, the received packet passes the filter and is uploaded to the host for further process. Otherwise, the packet is discarded either by on-chip processor or host driver. As mentioned above, this scheme choose several bits out of a 32-bit CRC result to index a look up table. The number of bits used depends on number of the connections supported. For example, 8-bit value is used if 256 connection addresses are supported; and 9-bit for 512 different connection addresses, etc. It is unlikely that a same 32-bit CRC value is rendered for different connection addresses. However, since only several bits of the resulted 32-bit might be used, the probability of the indexes to be the same even calculating from different connection addresses is substantially increased. This means that unwanted frames are uploaded to host, and consumes unnecessary processing power of the host CPU. This is an undesired situation in a high performance NIC. The proposed TCP connection address filter mechanism resolves this problem and achieves the goals of a high performance NIC.

Figure 5:
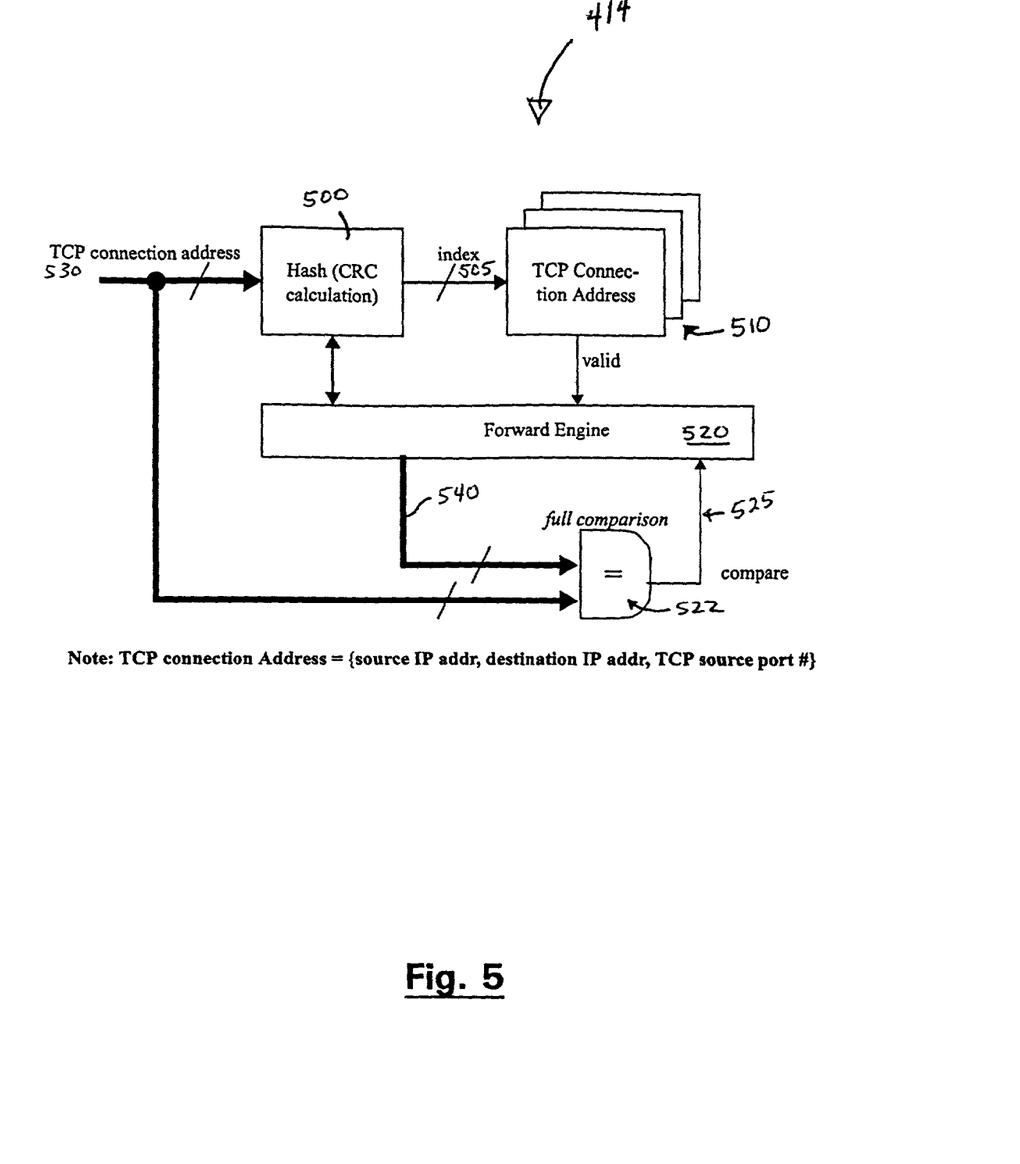
FIG. 5 is a block diagram of a connection address filter according to an embodiment of the present invention.

FIG. 5 provides a block diagram of an embodiment of the address filter 414 according to the present invention. This new address filter mechanism comprises a hashing device 500, TCP connection address tables 510, and a forward engine 520.

The hashing device may be any mechanism capable of rendering a unique index based on a set of parameters. Preferably, the hashing device utilizes a polynomial CRC calculation. A TCP connection address is input to the hashing mechanism which generates an index into the TCP connection address table(s) 510. The TCP connection address is a combination of a source IP address, a destination IP address, a TCP source port #, and a TCP destination port # of the packet being received, and is produced by combining information parsed from the packer headers.

The TCP connection address table is initialized by either host driver or embedded firmware, whichever is applicable. Each entry in the TCP Connection Address Table has a format that includes the TCP connection address and a validity flag. Table 2 provides an example TCP connection address entry format according to the present invention.

TABLE 2

| Valid | Next | TCP Port # | Dest. IP Addr. | Source IP |
|---|---|---|---|---|

TABLE 2-continued

| Bit | Location | (source & destination) | Addr. |
|---|---|---|---|

Valid Bit—If set, the valid bit indicates that this entry contains a valid TCP connection address. If cleared, the TCP connection address in this entry is invalid, and should be ignored.

Next Location—If null, only a single TCP connection address has been rendered onto this index (and valid is set). Otherwise, multiple TCP connection addresses have been rendered onto this same index and Next Location is a pointer to a next entry saved in a separate TCP Connection Address Table. In one embodiment, up to 2 tables may be referenced. The first table providing a TCP connection address for a primary connection, and all secondary TCP connection addresses hashed into a same index are stored in the second table.

The forward engine 520 evaluates the valid bit (status) and performs the task of using a comparison 525 (compared by a comparator 522) of the TCP connection address 530 of the incoming packet to the TCP connection address(es) 540 returned from the TCP connection Address table(s) 510 according to the hashed index 505. The comparison 525 indicates whether or not the incoming packet is part of an established connection for the host. If the incoming packet is not part of an established connection, it is discarded, otherwise, the packet is forwarded to a Data Management Buffer 430 via bus 440.

Figure 6:
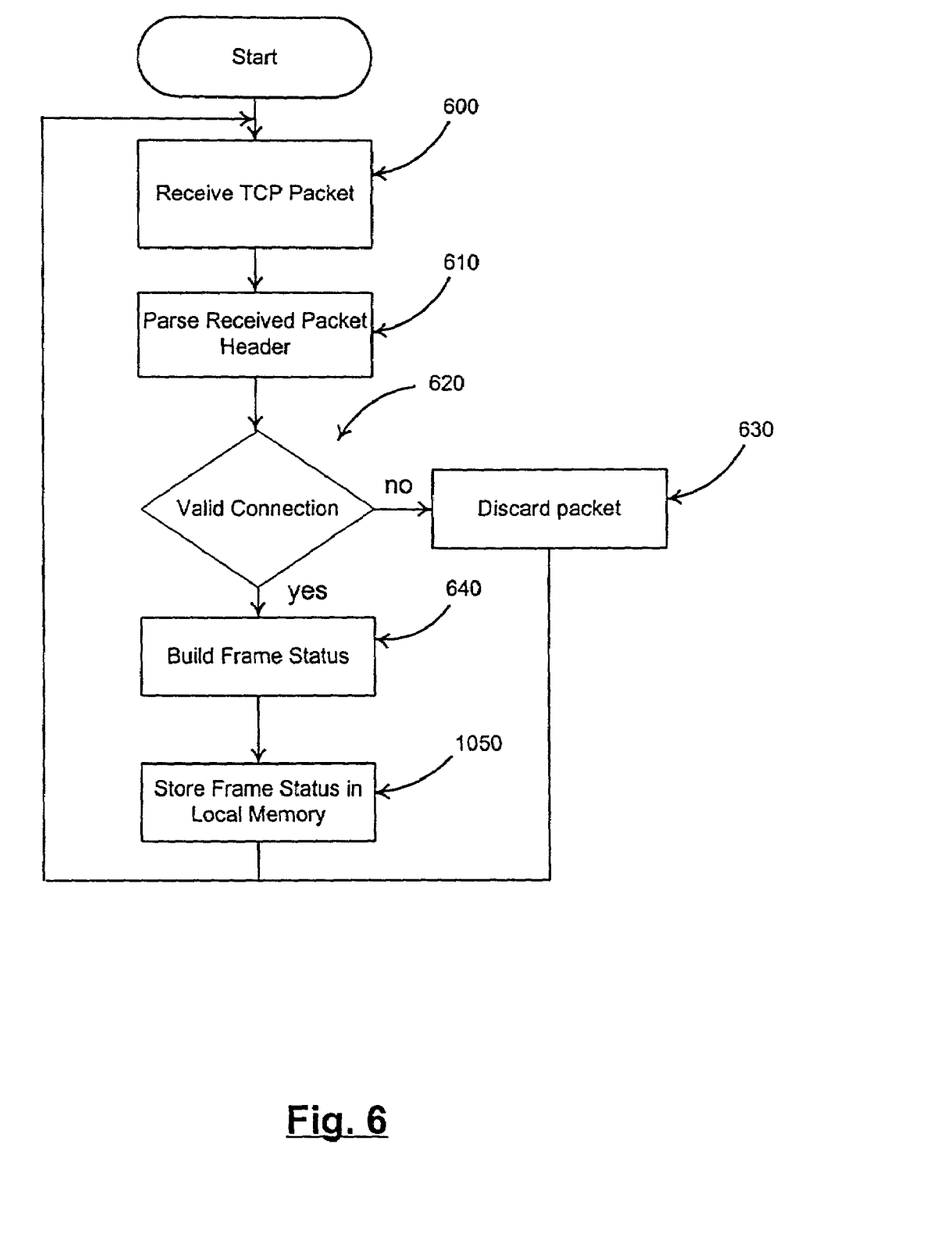
FIG. 6 is a high level flow chart of an embodiment of the present invention.

FIG. 6 is a high level flow chart of an embodiment of the present invention. At step 600, a packet is received by a NIC device attached to the host. The received packet is parsed into fields needed for checking for a valid connection and for building frame status (discussed below)(step 610). At step 620, it is determined (using the address filter, for example) if the incoming packet corresponds to a pre-established connection with the host. If not corresponding to an existing connection, the packet is discarded (step 630). If corresponding to an existing connection, a frame status is constructed and loaded into local memory of a processor that performs re-assembly of the received packet.

Figure 7:
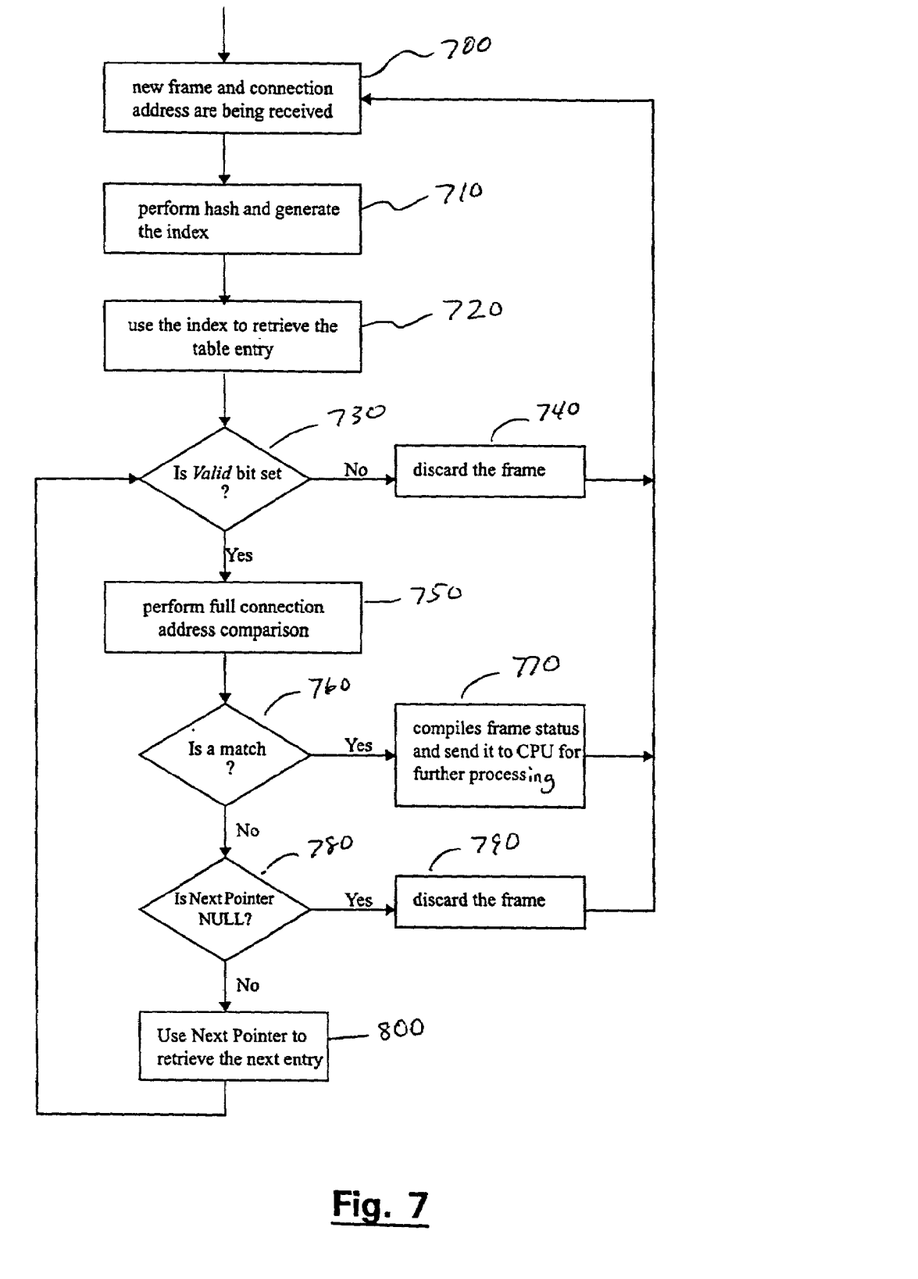
FIG. 7 is a flow chart illustrating a process for performing address comparison according to an embodiment of the present invention.

FIG. 7 is a flow chart illustrating a process for performing address comparison according to an embodiment of the present invention. For a new incoming frame (step 700), the packet header parser will extract several pre-defined fields out of TCP/IP headers needed to build a frame status structure (please refer to table 3 for an example frame status) and the TCP connection address. The address filter performs a hash function on the received TCP connection address (step 710). Preferably, the hash function is a polynomial CRC algorithm.

The Forward Engine uses the lower bits (number of bits depends on number of sessions supported) of the result of the hash function as an index to examine the location in the TCP Connection Address Table. For example, if approximately 8,000 connections are to be supported, the Forward Engine would utilize the lower 13 bits of the result of the hash function to produce the index (resulting in a possible number of indexed connections of 8192). Since only the lower bits of the hash result are utilized as an index, it is possible that more than one TCP connection address will be stored at the same index location. Therefore, a full comparison of the TCP connection address from the table and the incoming frame may be performed (see steps 7540 and 760, for example).

Therefore, the hashed function (hash 500, for example) returns an index. That index is applied to the TCP Connection address table to retrieve a TCP connection address entry (step 720). If the Valid bit in the retrieved TCP connection address entry is clear, the incoming frame (packet) is discarded (step 740).

If the valid bit is set, the forward engine performs a full comparison between the connection address of the received packet and the connection address of the indexed table entry (step 750). If the connection addresses match (step 760), the forward engine compiles a frame status and sends it to embedded CPU (via TCPRxFrameQ queue 450, for example)(step 770). The frame status is utilized for further processing (TCP re-assembly) of the received packet.

If the connection addresses (TCP connection addresses) do not match, the forward engine checks the status of the Next Location field of the indexed table entry (step 780). If the Next Location field is NULL, meaning only one TCP connection address hashed into this location, the received packet is discarded.

If the Next Location field is nonzero, meaning that multiple TCP connection addresses are hashed into the same table entry, the forward engine retrieves the next entry pointed to by the Next Location field (step 800) and performs a full comparison between the received connection address and the current indexed table entry (repeat of step 750). If the connection addresses match, the forward engine compiles a frame status and sends it to CPU (again, via TCPRxFrameQ queue, for example) for further processing (TCP re-assembly) of the received packet (step 770). If the connection addresses do not match, the forward engine uses the pointer in the Next Location field to retrieve the next entry for full comparison (repeat of step 800), and the entire process is repeated until a NULL is detected in the Next Location field.

The address filter also uses the parsed header fields to construct a frame status. Table 3 provides an example frame status structure according to an embodiment of the present invention (other variations, field names & locations, for example, may also be implemented).

TABLE 3

| Frame Pointer | Index | Next Pointer | Last Fragment | Fin Flag | Push Flag | Sequence Number | Packet Length | Payload Offset |
| --- | --- | --- | --- | --- | --- | --- | --- | --- |

1) The Frame Pointer Field points to a starting location of the incoming frame within the packet buffer (Data Management Buffer 430, for example).
2) The Index field is the hash value. Combined with the Next Pointer filed, it identifies a unique TCP connection. The embedded CPU can distinguish frames in one TCP segment from another TCP segment based on the connection addresses. In the case where two TCP connection addresses have been hashed into a same index location of the TCP connection address table, the embedded CPU can also read, if necessary, the IP address/TCP Port # with the supplied index/next pointer field.
3) The Fin(ish)/Push flags and Last Fragment (in IP header) field are set for the last frame of a current TCP segment. The embedded CPU can use this information to determine if the last frame of a current TCP segment has been received.
4) The Sequence Number (in TCP header) field identifies the order of this frame in a TCP segment. Based on the Sequence Number, the embedded CPU can re-arrange the received frame (via its pointer) to form the segment of which the received frame is part of.
5) The Packet Length Field provides the length of the received packet (frame).
6) The Payload Offset provides a starting position where the payload starts within the received packet.

The frame status is built using the parsed header fields. In one embodiment, The frame status for each valid frame is stored in a local memory accessible by the embedded CPU and thereafter used by embedded CPU for TCP packet re-assembly. Thus, the embedded CPU does not have to access the packet header within a frame saved in packet buffer.

Based on the information presented in the frame status structure, the embedded CPU can perform the TCP re-assembly protocol which is well defined. If each packet within a particular segment has been received, the embedded CPU then pushes the frame pointers/payload offset associated with this segment in sequence into a frame queue (frameRxQueue queue 460, for example). A buffer control device (RxBufCtrl logic 470, for example) then uploads each packet to the host with the payload only. The buffer control device uses the payload offset to determine where the payload starts within the frame, and uploads the payload to the host.

In most cases, use of the frame status locally stored and accessible to the embedded CPU, such that the embedded CPU does not have to access the packet buffer to perform packet re-assembly, significantly reduces the burden carried by the embedded CPU, and, therefore, the embedded CPU is better able to handle the required throughput for TCP re-assembly. The present invention may also be applied to a host CPU that performs packet re-assembly by saving the frame status in a memory of the host, accessible by the host CPU. In addition, the processes of the present invention may be applied to packet format other than TCP.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/ specialized computer or microprocessor are software modules for implementing the teachings of the present invention, including, but not limited to, receiving and parsing packet headers, constructing connection addresses from packet headers, querying connection databases, constructing frame status, storing frame status in a memory local and accessible to an embedded CPU or other processor configured to perform packet re-assembly, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A packet accelerator device, comprising:
   a packet header parser configured to parse packet header fields from incoming packets directed toward a host;
   a processing mechanism configured to perform packet re-assembly on packets determined to have valid connections with said host; and
   an address filter configured to identify data parsed from said packet header fields needed for packet re-assembly and place that data in a local memory directly accessible by said processing mechanism;
   wherein:
   said address filter comprises,
   a hashing mechanism configured to determine an index based on at least part of the parsed header fields,
   a connection table containing connection information indexed by said hashing mechanism, and
   a forward engine configured to,
   retrieve connection table values from said connection table corresponding to the incoming packets and compare the retrieved connection table values with the incoming,
   discard incoming packets that do not have matching connection information in said connection table,
   forward the incoming packets to the processing mechanism for re-assembly if the incoming packets have matching connection information in said connection table, and
   retrieve additional connection table values from said connection table when more than one connection has been stored by reference to said index; and
   said connection table comprises a set of first connection address data, each first connection address data is stored at a hashed index location and includes a pointer that is either null, indicating the first connection address data is the only connection address saved at its corresponding hashed index location, or pointing to a next connection address data indicating a next connection address saved at a same hashed index.

2. The packet accelerator according to claim 1, wherein said processing mechanism is an embedded CPU within the packet accelerator.

3. The packet accelerator according to claim 1, wherein said processing mechanism is an embedded CPU within a router.

4. The packet accelerator according to claim 1, further comprising:
   a frame status device configured to determine a frame status of an incoming frame of the incoming packet;
   wherein said frame status comprises:
   a frame pointer configured to point to a memory location of a packet buffer of the incoming frame;
   at least one index/pointer field capable of being used to determine a connection address corresponding to the incoming packet;
   segment data comprising information that identifies whether a full segment of packets corresponding to the incoming packet have been received;
   sequence data identifying an order of the incoming frame within the segment corresponding to the incoming packet;
   length of the incoming packet; and
   an offset identifying a starting position of a payload of the incoming packet.

5. The packet accelerator according to claim 1, wherein:
   said address filter identifies if the incoming packet is part of an established connection by performing a polynomial CRC calculation on a predetermined number of lower bits of a TCP connection address of said incoming packet, indexing into a connection table with the polynomial CRC calculation as an index, the connection table comprising a first valid connection for the index and a list of additional valid connections for the same index, and comparing the TCP connection to each of the first valid connection and each additional valid connection until a match is made.

6. The packet accelerator according to claim 5, wherein the connection table references two separate tables, the first table providing the TCP connection address for a primary connection and the second table comprising all secondary TCP connections hashed into a same index.

7. A method of accelerating packet re-assembly, comprising the steps of:
   parsing a header fields of an incoming packet to determine data needed for packet re-assembly;
   forwarding the packet to be re-assembled to a re-assembly mechanism;
   placing the data needed for packet re-assembly in a local memory directly accessible by said re-assembly device; and
   identifying if the incoming packet is part of an established connection with said host;
   wherein:
   said step of determining if the incoming packet is part of an established connection comprises the steps of:
   hashing at least part of the parsed header fields to determine an index into a connection table;
   retrieving connection information from the connection table based on said index;
   comparing the connection information retrieved from the connection table to connection information from the parsed header fields;
   if the connection information from the connection table matches the connection information from the parsed header fields, then, identifying the incoming packet as being part of an established connection with said host; and if the connection information from the connection table does not match the connection information from the parsed header, then, determining if any additional connection addresses are hashed into the connection table at said index, and if additional connection address are hashed into the connection table at said index, then, retrieving the additional connection addresses, comparing the additional connection addresses to the connection information from the parsed header fields, and if any of the additional connection addresses match the parsed header fields, identifying the incoming packet as being part of an established connection with said host.

8. The method according to claim 7, wherein:

said step of determining if any additional connection addresses are hashed into the connection table at said index comprises determining if a next pointer field at said index of the connection table is null, indicating no other connection addresses are hashed into the index, or, not null, indicating that additional connection addresses have been hashed into the connection table at the index; and said step of retrieving the additional connection addresses comprises reading data pointed to by the next pointer field in the connection table at the index and each subsequent next pointer field of the read data.

9. The method according to claim 7, wherein said step of hashing comprises performing a polynomial CRC calculation on a predetermined number of lower bits of a TCP connection address of said incoming packet.

10. The method according to claim 9, wherein said predetermined number of lower bits comprises a number of bits needed to identify a number of connections supported by said host.

* * * * *